(12) United States Patent
Patel et al.

(10) Patent No.: US 6,600,668 B1
(45) Date of Patent: Jul. 29, 2003

(54) CROWBAR CIRCUIT FOR LOW OUTPUT VOLTAGE DC/DC CONVERTERS

(75) Inventors: Raoji A. Patel, Framingham, MA (US); Raymond A. Pelletier, Goffstown, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/152,098

(22) Filed: May 21, 2002

(51) Int. Cl.$^7$ .............................................. H02M 3/335
(52) U.S. Cl. ................ 363/21.06; 363/21.14; 363/53; 363/56.11
(58) Field of Search .................. 363/21.06, 21.14, 363/53, 56.05, 56.08, 56.11

(56) References Cited

U.S. PATENT DOCUMENTS 6,069,802 A * 5/2000 Priegnitz .................. 363/21.06
6,529,390 B2 * 3/2003 Takahashi ................. 363/21.14

OTHER PUBLICATIONS

Adding an Over–Voltage Crowbar to an RC5051 Converter: Design and Analysis, Application Bulletin AB–17, Fairchild Semiconductor, www.fairchildsemi.com.

DC–DC Converter Basics, Power Designers, http://www.powerdesigners.com/InfoWeb/design_center/articles/DC–DC/converter.shtm, G. Ledwich, 1998.

Surge Protectors & Line Filters for Critical Non–Fail Applications, Brick Wall Division, Price Wheeler Corporation, San Diego, California, http://www.brickwall.com/how-work.htm.

* cited by examiner

*Primary Examiner*—Jeffrey Sterrett

(57) ABSTRACT

A crowbar circuit comprises an over-voltage detector that monitors the output voltage of a synchronous DC/DC converter. When the output voltage rises above a predetermined threshold, the detector applies a control signal to a MOSFET switch that is already in use as part of a rectifier in the converter. The control signal overrides a periodic switching signal applied to the gate of the MOSFET, causing it to conduct continuously and thereby apply a shunt path for the output current of the rectifier. The control signal may be continuously applied until the converter is manually reset. Because the voltage across the conducting MOSFET is small and it can be turned on quickly, the MOSFET rapidly clamps the DC/DC converter's output to a voltage low enough to avoid damage to integrated circuitry powered by the converter.

5 Claims, 2 Drawing Sheets

CROWBAR CIRCUIT FOR LOW OUTPUT VOLTAGE DC/DC CONVERTERS

FIELD OF THE INVENTION

The present invention relates to crowbar circuits and, more specifically, to crowbar circuits in DC/DC converters.

BACKGROUND OF THE INVENTION

By definition, a DC/DC converter accepts a DC input voltage and produces a DC output voltage, typically different from the input voltage. Various types of DC/DC converters are known in the art to step up, step down or invert a DC voltage in applications including, but not limited to, voltage regulators, noise isolators, power supplies, bus regulators, and voltage adapters. For many applications, synchronous DC/DC converters are desirable because they can be programmed, in software and/or hardware, to output ranges of different voltage output levels.

Specifically, synchronous DC/DC converters are used as power supplies for low-voltage integrated circuits. Because the trend in computer architecture is toward small, low-power components capable of operating at very high frequencies, computer circuitry often consists of densely packed integrated components only fractions of a micrometer in size. The sub-micrometer integrated components operate at low-voltages, e.g. less than 2 volts, and require stable, low-noise power supplies. Synchronous DC/DC converters meet the requirements for supplying power to these integrated components.

However, integrated circuitry requiring a stable, low-voltage source can be extremely susceptible to voltage surges. Therefore, power supplies for these low-voltage devices often have some form of over-voltage protection to protect against voltage spikes. A voltage surge within a power supply can arise for many different reasons, e.g. a failed component within the supply or a voltage spike at the supply's input.

Crowbar circuits provide one form of over-voltage protection for low-voltage DC/DC converters. Typically, a crowbar circuit monitors the level of an output voltage, and if the output voltage rises above a predetermined level, the crowbar circuit reduces the output voltage toward zero. This is often accomplished by triggering a shunt-connected silicon controlled rectifier (SCR) or metal-oxide-semiconductor field effect transistor (MOSFET) thereby shunting output current through the conducting SCR or MOSFET and thus away from the DC/DC converter output. Crowbar circuitry protecting the output of a DC/DC converter usually occupies separate space on a circuit board and, consequently, adds to the cost of the overall circuit.

It is therefore generally desirable to provide a more cost- and space-effective crowbar circuit for use with low-voltage applications. The crowbar should work with low-voltage power supplies, such as synchronous DC/DC converters, without requiring additional power components and heat sinks. The crowbar should also respond quickly to changes in a power supply output voltage so as to protect low-voltage components that is are easily damaged by voltage surges.

SUMMARY OF THE INVENTION

The present invention overcomes the disadvantages of previous crowbar circuits by utilizing one or more components that function as both crowbar shunts and power supply rectifier components. Because the crowbar circuit uses switching components already in use by the power supply, the circuit costs less and occupies less space than a conventional crowbar circuit.

More specifically, the circuit comprises an over-voltage detector that monitors the output voltage of a synchronous DC/DC converter. When the output voltage rises above a predetermined threshold, the detector triggers a MOSFET switch already in use as a rectifier in the converter. The trigger signal overrides a periodic switching signal applied to the gate of the MOSFET, causing it to conduct continuously and thereby apply a shunt path for the output current of the rectifier. Because the conducting MOSFET has a small voltage drop and can be turned on quickly, the MOSFET rapidly clamps the DC/DC converter's output to a voltage low enough to avoid damage to integrated circuitry powered by the converter.

BRIEF DESCRIPTION OF THE DRAWINGS

The above and further advantages of the invention may be better understood by referring to the following description in conjunction with the accompanying drawings, of which.

DETAILED DESCRIPTION OF AN ILLUSTRATIVE EMBODIMENT

Figure 1:
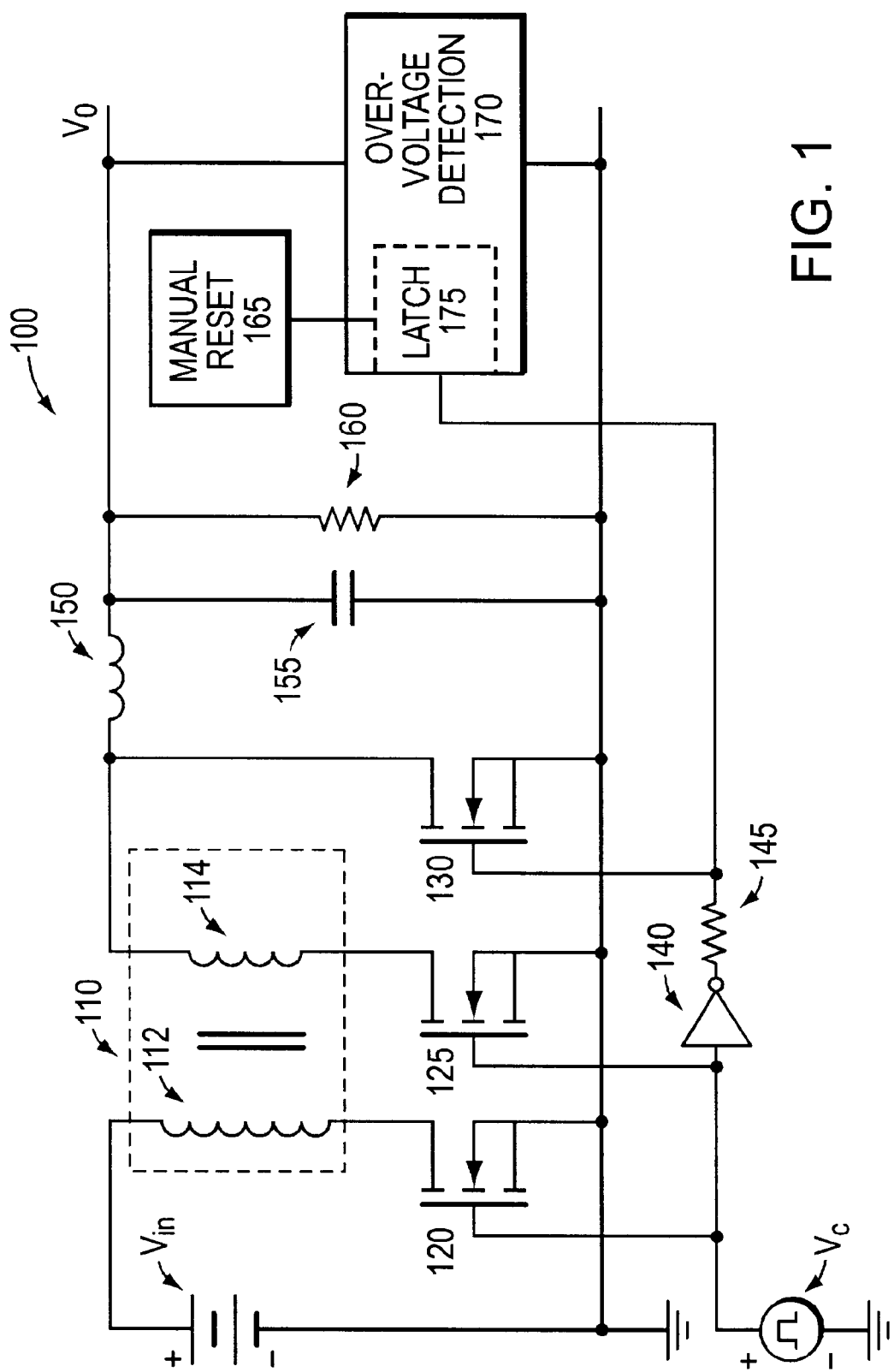
FIG. 1 is a schematic diagram of a simplified synchronous DC/DC converter incorporating a crowbar circuit that embodies the invention.

As shown in FIG. 1, a converter 100 embodying the invention converts a DC input voltage $V_{in}$ to a DC output voltage $V_O$. Operationally, the input voltage is AC-modulated and applied to the primary winding 112 of a power transformer 110 by cycling a power MOSFET switch 120 according to a clock signal $V_c$ applied to its gate. Similarly, power MOSFET switches 125 and 130 connected to the transformer's secondary winding 114 are turned on and off in synchronization with the modulating signal.

Specifically, the signal $V_c$ is applied to the gates of MOSFET 120 and MOSFET 125, and an inverter 140 applies an inverted version of the signal to the gate of MOSFET 130. Therefore, when signal $V_c$ is a logical "high" digital signal, MOSFET switches 120 and 125 are turned on and MOSFET switch 130 is turned off. Likewise, when signal $V_c$ is a logical "low" digital signal, MOSFET switches 120 and 125 are turned off and MOSFET switch 130 is turned on.

The switches 125 and 130 operate as a synchronous rectifier. Specifically, when signal $V_c$ turns on MOSFET switches 120 and 125, power is transferred to an output load resistor 160. In this case, load current flows through MOSFET 125, secondary winding 114, and a filter inductor 150. When MOSFET switches 120 and 125 are turned off by signal $V_c$, MOSFET switch 130 is turned on and the load current continues to flow to output load resistor 160 through MOSFET 130 and filter inductor 150.

The AC-ripple in the output of the rectifier is filtered by the inductor 150 and a capacitor 155 thereby providing a smooth DC output voltage. A typical DC supply also includes voltage-regulating circuitry which controls the duty-cycle of the MOSFET switch 120 and/or the switching of 125 and 130. This circuitry has been omitted from the drawing for reasons of clarity.

In the event the output voltage rises above a predetermined "dangerous" level, an over-voltage detection module 170 emits a control signal that forces MOSFET switch 130 to conduct continuously by overriding the output of inverter 140. For this purpose, a resistor 145 isolates the inverter from a logical "high" signal applied to the gate of switch 130. The output voltage is thus clamped to a safe level, as capacitor 155 rapidly discharges through the inductor 150 and the switch 130.

More specifically, the time constant of the filter comprising inductor 150 and capacitor 155 is relatively small, and the voltage across the capacitor can thus be quickly discharged through the inductor, e.g. to approximately 0.2 volts, in less than 150 microseconds. Therefore, the MOSFET switch 130 not only provides rectification in the normal operation of the DC/DC converter, but also performs the function of rapidly discharging the capacitor when the over-voltage detection module detects an unsafe rise in the output voltage.

Figure 2:
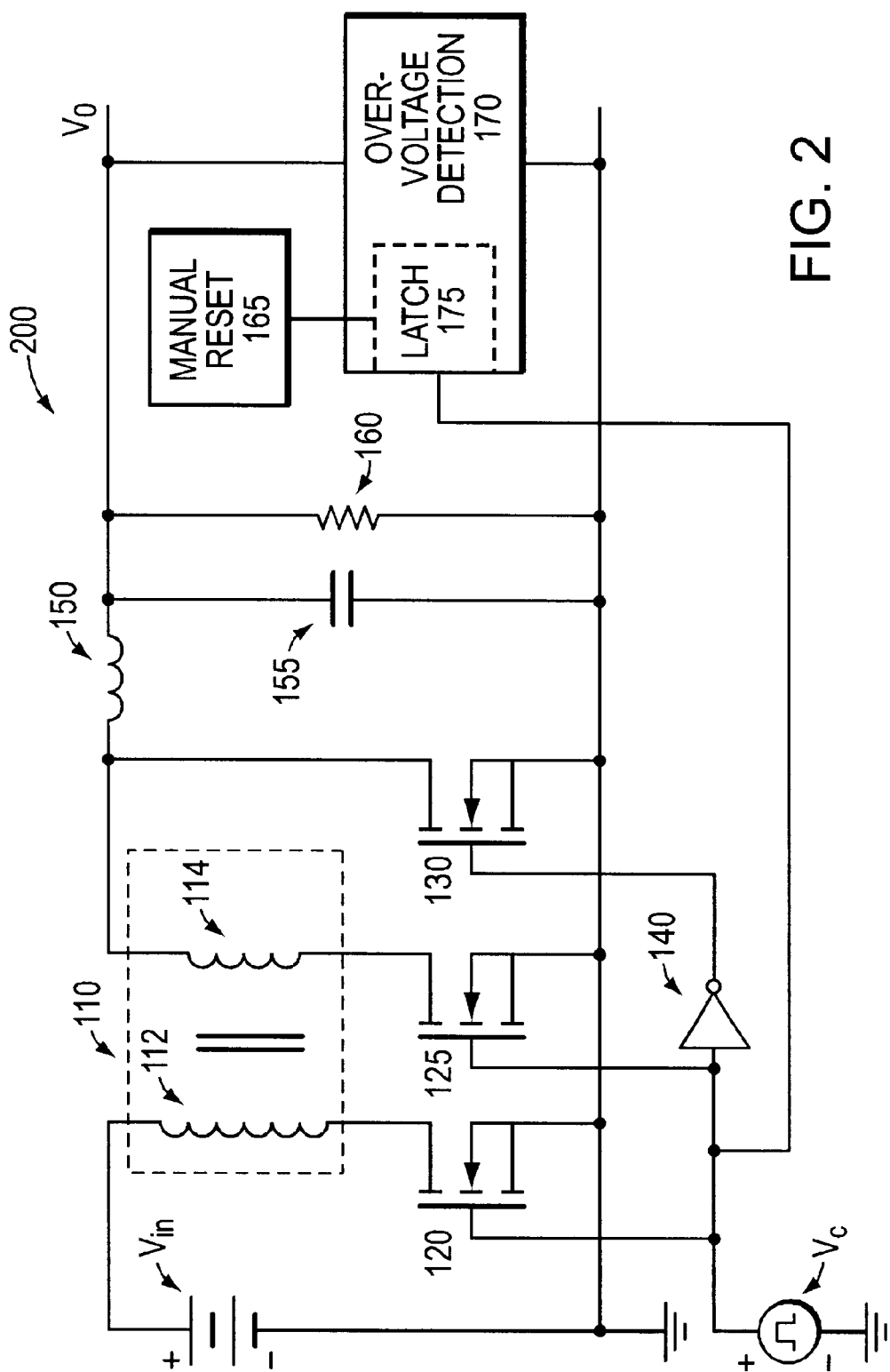
FIG. 2 is a schematic diagram of an alternate embodiment of the converter in FIG. 1.

In the converter 200 shown in FIG. 2, the over-voltage detection module 170 applies a logical "low" control signal to the gates of MOSFET switches 120 and 125. In this case, the signal overrides signal $V_c$ and forces switches 120 and 125 to turn "off" and switch 130 to continuously conduct.

Because the detection module 170 senses potentially dangerous rises in the output voltage that may result from failure of various circuit components in the converter or the power source, it is expressly contemplated that the output voltage may be clamped at a safe level until the circuit is manually reset. This allows a technician to perform appropriate diagnostic procedures before the converter is returned to normal operation. For example, the detection module may include a latch 175, such as a flip-flop, that maintains MOSFET switch 130 in a conducting state and thereby clamps the output voltage until the latch is manually reset. A manual reset 165 applies a signal to reset the latch and remove the overriding control signal applied to the gate of switch 130.

The foregoing is a detailed description of an illustrative embodiment of the invention. Various modifications and additions can be made without departing from the spirit and scope of the invention. For example, the power MOSFET switches may be replaced with different switching components that conduct as described herein. Although a simplified synchronous DC/DC converter has been described, additional circuitry, such as voltage regulators, noise filters, power switches, fuses, LED indicators, etc., can be added without losing the benefit of the novel crowbar circuit. Accordingly this description is meant to be taken only by way of example and not to otherwise limit the scope of the invention.

What is claimed is:

1. A power supply, comprising:
   a transformer having primary and secondary windings;
   means for applying an AC input to the primary winding;
   a switchable rectifier connected to the secondary winding to provide a DC output between a first output terminal and a second output terminal, the rectifier including a switch which, when conducting, provides a DC path between the first and second output terminals; and
   an over-voltage detector that applies a control signal to the switch when the DC output rises above a predetermined level, thereby forcing the switch to conduct continuously.

2. The power supply of claim 1, wherein the power supply is a synchronous DC/DC converter.

3. The power supply of claim 1, wherein the switch is a MOSFET.

4. The power supply of claim 1, wherein the over-voltage detector further comprises:
   a latch that applies the control signal to the switch until the latch is reset; and
   means for manually resetting the latch.

5. A power supply, comprising:
   a transformer having primary and secondary windings, the secondary winding having a first end and a second end;
   means for applying an AC input to the primary winding;
   a rectifier connected to rectify the voltage across the secondary winding and thereby provide a DC output between a first output terminal and a second output terminal, the rectifier including:
      a first switch connected between the first end of the secondary winding and the second output terminal; and
      a second switch connected between the second end of the secondary winding and the second output terminal;
   an inductor connected between the second end of the secondary winding and the first output terminal;
   means for applying a clock signal to the first switch and an inverted version of the clock signal to the second switch; and
   an over-voltage detector that applies a control signal to the second switch when the DC output rises above a predetermined level, thereby overriding the inverted version of the clock signal applied to the second switch and forcing the second switch to conduct continuously.

\* \* \* \* \*